US010393010B2

(12) United States Patent
Ueda

(10) Patent No.: US 10,393,010 B2
(45) Date of Patent: Aug. 27, 2019

(54) MULTI-ARC BEARING AND TURBOCHARGER

(71) Applicant: IHI Corporation, Koto-ku (JP)

(72) Inventor: Akihiro Ueda, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 15/862,094

(22) Filed: Jan. 4, 2018

(65) Prior Publication Data

US 2018/0128163 A1 May 10, 2018

Related U.S. Application Data

(63) Continuation of application No. PCT/JP2016/070400, filed on Jul. 11, 2016.

(30) Foreign Application Priority Data

Jul. 16, 2015 (JP) ................................ 2015-142158

(51) Int. Cl.
*F02B 39/00* (2006.01)
*F16C 17/02* (2006.01)
(Continued)

(52) U.S. Cl.
CPC .......... *F02B 39/005* (2013.01); *F16C 17/028* (2013.01); *F16C 17/10* (2013.01);
(Continued)

(58) Field of Classification Search
CPC ........ F16C 17/028; F16C 27/02; F16C 32/06; F16C 32/0626; F16C 32/0633;
(Continued)

(56) References Cited

U.S. PATENT DOCUMENTS 1,940,301 A * 12/1933 Grobel .................. F16C 23/045
384/291
2,629,640 A * 2/1953 Cozzo ................. F16C 33/1075
384/313
(Continued)

FOREIGN PATENT DOCUMENTS

DE 100 30 698 A1 1/2002
EP 1 762 713 A2 3/2007
(Continued)

OTHER PUBLICATIONS

International Preliminary Report on Patentability and Written Opinion dated Jan. 25, 2018 in PCT/JP2016/070400.
(Continued)

*Primary Examiner* — Marcus Charles
(74) *Attorney, Agent, or Firm* — Oblon, McClelland, Maier & Neustadt, L.L.P.

(57) ABSTRACT

A multi-arc bearing includes: a bearing surface a cross-sectional shape of which perpendicular to an axial direction of a shaft includes a plurality of arcs; and an oil supply groove provided on the bearing surface and extending in the axial direction of the shaft, the oil supply groove having a bearing clearance at a front side end portion in a rotation direction of the shaft smaller than a bearing clearance at a rear side end portion in the rotation direction.

13 Claims, 2 Drawing Sheets

L ← → R
C(1) 16 4 15 3 S 7 2 12 13 6 14 11 10 9 2a 8 5

III 7a(7) 23 2 7a(7) 20c 20d 20a 20e 20a 8a 20c 20d 20a 20e 20a 22 III 2a 20j 2c S(20) 2b 21 20b 8

(51) Int. Cl.

| | |
|---|---|
| ***F16C 37/00*** | (2006.01) |
| ***F16C 27/02*** | (2006.01) |
| ***F16C 32/06*** | (2006.01) |
| ***F16C 33/10*** | (2006.01) |
| ***F16C 17/10*** | (2006.01) |
| *F01D 25/18* | (2006.01) |

(52) U.S. Cl.

CPC .......... *F16C 27/02* (2013.01); *F16C 32/0633* (2013.01); *F16C 33/1065* (2013.01); *F16C 33/1075* (2013.01); *F01D 25/18* (2013.01); *F05D 2220/40* (2013.01); *F16C 37/002* (2013.01); *F16C 2360/24* (2013.01); *F16N 2210/14* (2013.01)

(58) Field of Classification Search

CPC ............... F16C 32/0688; F16C 33/101; F16C 33/1065; F16C 33/1075; F16C 2360/24; F16C 37/002; F04D 29/056; F05D 2220/40; F05D 2220/54; F16N 2210/14; F01D 25/166; F01D 25/18; F01D 25/162; F02B 39/005

USPC ......... 384/95, 100, 114, 282, 313, 316, 397, 384/901; 415/229

See application file for complete search history.

(56) References Cited

U.S. PATENT DOCUMENTS

| | | | | |
|---|---|---|---|---|
| 4,090,743 | A * | 5/1978 | Suzuki | B24B 41/04 384/113 |
| 6,402,385 | B1 | 6/2002 | Hayakawa et al. | |
| 6,966,700 | B2 * | 11/2005 | Weissbacher | F16C 17/02 384/313 |
| 7,429,132 | B1 * | 9/2008 | Marussich | F16C 17/18 384/114 |
| 9,279,453 | B2 * | 3/2016 | Laubender | F16C 17/02 |
| 9,664,063 | B2 * | 5/2017 | Boening | F01D 25/166 |
| 2003/0081867 | A1 | 5/2003 | Weissbacher | |
| 2006/0078239 | A1 * | 4/2006 | Dimofte | F16C 32/0685 384/100 |
| 2010/0092115 | A1 | 4/2010 | Wendling | |
| 2015/0330442 | A1 * | 11/2015 | Futae | F16C 17/18 415/111 |

FOREIGN PATENT DOCUMENTS

| | | | | |
|---|---|---|---|---|
| FR | 2 810 704 A1 | | 12/2001 | |
| GB | 993842 A | * | 6/1965 | F16C 17/24 |
| JP | 57-129918 | | 8/1982 | |
| JP | 61-136098 | | 6/1986 | |
| JP | 01-193409 | | 8/1989 | |
| JP | 08-091292 | | 4/1996 | |
| JP | 2001-116046 | | 4/2001 | |
| JP | 2002-369446 | | 12/2002 | |
| JP | 2007-071165 | | 3/2007 | |
| JP | 2007-170296 | | 7/2007 | |
| JP | 2007-263311 | | 10/2007 | |
| JP | 2008057346 A | * | 3/2008 | F01C 21/02 |

OTHER PUBLICATIONS

International Search Report dated Sep. 13, 2016 in PCT/JP2016/070400 filed Jul. 11, 2016 (with English Translation).

Written Opinion dated Sep. 13, 2016 in PCT/JP2016/070400 filed Jul. 11, 2016.

Office Action dated Sep. 11, 2018 in corresponding Japanese Patent Application No. 2017-528668 (with English Translation), 7 pages.

Combined Chinese Office Action and Search Report dated Dec. 5, 2018 in Patent Application No. 201680039471.0, citing document AO therein, 21 pages (with Japanese and English translation).

Office Action dated Feb. 12, 2019 in corresponding Japanese Patent Application No. 2017-528668 (with English Translation), citing document AA therein, 5 pages.

* cited by examiner

MULTI-ARC BEARING AND TURBOCHARGER

CROSS REFERENCE TO RELATED APPLICATIONS

This application is a continuation application of International Application No. PCT/JP2016/070400, filed on Jul. 11, 2016, which claims priority to Japanese Patent Application No. 2015-142158, filed on Jul. 16, 2015, the entire contents of which are incorporated by reference herein.

BACKGROUND ART

Technical Field

The present disclosure relates to a multi-arc bearing pivotally supporting a shaft, and a turbocharger.

Related Art

In the related art, turbochargers in which a shaft is pivotally supported by a bearing housing in a freely rotatable manner are known. A turbine impeller is provided at one end of the shaft and a compressor impeller is provided at another end. The turbocharger is connected to an engine, and the turbine impeller is rotated by exhaust gas discharged from the engine. The rotation of the turbine impeller causes the compressor impeller to rotate via the shaft. In this manner, the turbocharger compresses the air in accordance with the rotation of the compressor impeller and delivers the air to the engine.

The shaft of the turbocharger is pivotally supported, for example, by a semi-floating bearing. The semi-floating bearing is an annular member. A bearing surface is formed on an inner circumferential surface of the semi-floating bearing. Patent Literature 1 describes a turbocharger to which a so-called multi-arc bearing is mounted. The shape of the bearing surface of the multi-arc bearing includes a plurality of arcs connected to each other in a cross section perpendicular to a shaft.

CITATION LIST

Patent Literature

Patent Literature 1: Japanese Patent Application Laid-Open No. 1-193409

SUMMARY

Technical Problem

Meanwhile, the viscosity of lubricating oil that lubricates between a shaft and a bearing surface depends on the oil temperature. Therefore, when the amount of oil flowing into (flowing out from) a gap between the shaft and the bearing surface becomes too large, a cooling effect of an oil film of the lubricating oil becomes too high. As the oil film temperature decreases, the viscosity of the lubricating oil does not decrease. Thus, a mechanical loss increases.

An object of the present disclosure is to provide a multi-arc bearing and a turbocharger capable of sufficiently raising the temperature of lubricating oil to reduce a mechanical loss.

Solution to Problem

In order to solve the above problem, a multi-arc bearing of the present disclosure includes: a bearing surface a cross-sectional shape of which perpendicular to an axial direction of a shaft includes a plurality of arcs; and an oil supply groove provided on the bearing surface and extending in the axial direction of the shaft, the oil supply groove having a bearing clearance at a front side end portion in a rotation direction of the shaft smaller than a bearing clearance at a rear side end portion in the rotation direction.

The oil supply groove may be arranged between two arcs adjacent to each other in the rotation direction of the shaft, and the bearing surface may include: an expanding portion in which the bearing clearance expands continuously in the rotation direction; and a shrinking portion in which the bearing clearance shrinks continuously in the rotation direction, the expanding portion and the shrinking portion arranged alternately in the rotation direction.

The front side end portion may be continuous with the shrinking portion, and the rear side end portion may be continuous with the expanding portion.

The multi-arc bearing may be a semi-floating bearing having an annular main body portion in which the bearing surface is formed on an inner circumferential surface thereof.

In order to solve the above problem, a turbocharger of the present disclosure includes the multi-arc bearing described above.

Effects of Disclosure

According to the present disclosure, it is possible to sufficiently raise the temperature of lubricating oil to reduce a mechanical loss.

DESCRIPTION OF EMBODIMENT

A reasonable embodiment will be described in detail below with reference to the accompanying drawings. The dimensions, materials, other specific numerical values, and the like illustrated in such embodiment are merely examples for facilitating understanding, and a structure is not limited thereby except for a case where it is specifically mentioned. Note that, in the present specification and the drawings, elements having substantially the same function and structure are denoted by the same symbol, and redundant explanations are omitted.

Figure 1:
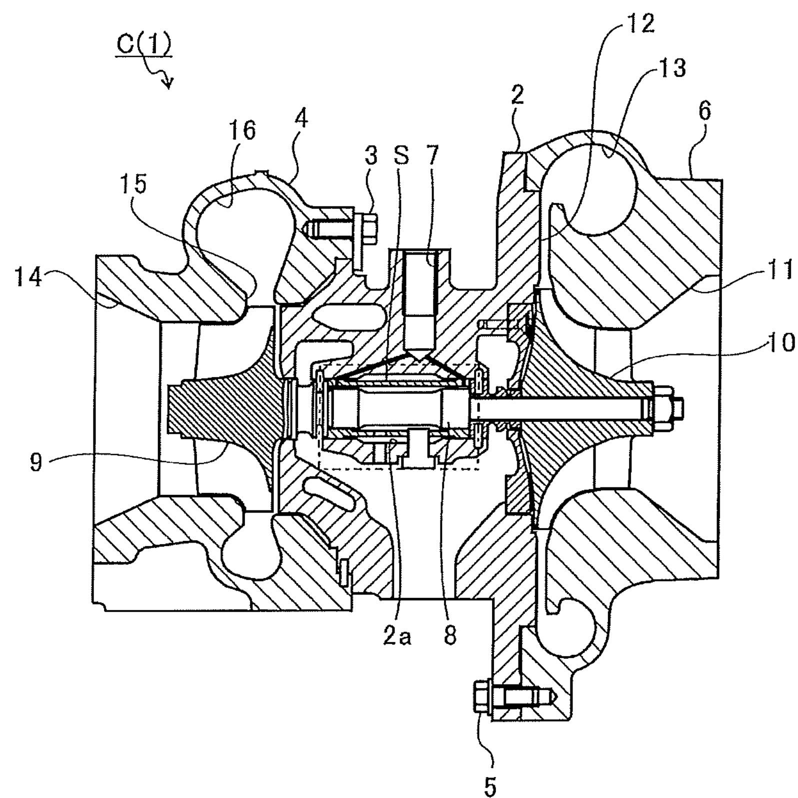
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is a left side of the turbocharger C and that a direction of an arrow R is a right side of the turbocharger C. As illustrated in FIG. 1, the turbocharger C includes a turbocharger main body 1. The turbocharger main body 1 includes a bearing housing 2. A turbine housing 4 is connected to the left side of the bearing housing 2 by a fastening bolt 3. A compressor housing 6 is connected to the right side of the bearing housing 2 by a fastening bolt 5. The bearing housing 2, the turbine housing 4, and the compressor housing 6 are integrated.

In the bearing housing 2, a bearing hole 2*a* penetrating the turbocharger C in the right-and-left direction is formed. In the bearing housing 2, an oil supply passage 7 for introducing lubricating oil from the outside to the bearing hole 2*a* is further formed. The bearing hole 2*a* is filled with the lubricating oil supplied from the oil supply passage 7. A semi-floating bearing S is accommodated in the bearing hole 2*a*. A shaft 8 is pivotally supported by the semi-floating bearing S in a freely rotatable manner. A turbine impeller 9 is integrally fixed to a left end portion of the shaft 8. The turbine impeller 9 is accommodated in the turbine housing 4 in a freely rotatable manner. A compressor impeller 10 is integrally fixed to a right end portion of the shaft 8. The compressor impeller 10 is accommodated in the compressor housing 6 in a freely rotatable manner.

In the compressor housing 6, an intake port 11 opening toward the right side of the turbocharger C is formed. The intake port 11 is connected to an air cleaner (not illustrated). In a state where the bearing housing 2 and the compressor housing 6 are connected by the fastening bolt 5, opposing surfaces of the bearing housing 2 and the compressor housing 6 form a diffuser flow passage 12 for pressurizing the air. The diffuser flow passage 12 is annularly formed outward from an inner side in the radial direction of the shaft 8. The diffuser flow passage 12 communicates with the intake port 11 via the compressor impeller 10 on the inner side in the radial direction.

Furthermore, the compressor housing 6 is provided with a compressor scroll flow passage 13 of an annular shape. The compressor scroll flow passage 13 is positioned outward in the radial direction of the shaft 8 with respect to the diffuser flow passage 12. The compressor scroll flow passage 13 communicates with an intake port of an engine (not illustrated). The compressor scroll flow passage 13 communicates also with the diffuser flow passage 12. When the compressor impeller 10 rotates, therefore, the air is sucked into the compressor housing 6 from the intake port 11. The sucked air is accelerated and pressurized in the process of flowing through blades of the compressor impeller 10. The accelerated and pressurized air is further pressurized (recovered of the pressure) by the diffuser flow passage 12 and the compressor scroll flow passage 13 and guided into the engine.

A discharge port 14 is formed in the turbine housing 4. The discharge port 14 opens to the left side of the turbocharger C. The discharge port 14 is connected to an exhaust gas purification device (not illustrated). Further, in the turbine housing 4, a flow passage 15 and an annular turbine scroll flow passage 16 are provided. The turbine scroll flow passage 16 is positioned outward in the radial direction of the shaft 8 with respect to the flow passage 15. The turbine scroll flow passage 16 communicates with a gas inlet port (not illustrated). Exhaust gas discharged from an exhaust manifold of the engine is guided to the gas inlet port. The turbine scroll flow passage 16 communicates also with the flow passage 15. Therefore, the exhaust gas guided from the gas inlet port to the turbine scroll flow passage 16 is guided to the discharge port 14 via the flow passage 15 and the turbine impeller 9. The exhaust gas guided to the discharge port 14 rotates the turbine impeller 9 in the process of flowing therethrough. The turning force of the turbine impeller 9 is then transmitted to the compressor impeller 10 via the shaft 8. The turning force of the compressor impeller 10 allows the air to be pressurized and guided to the engine as described above.

Figure 2:
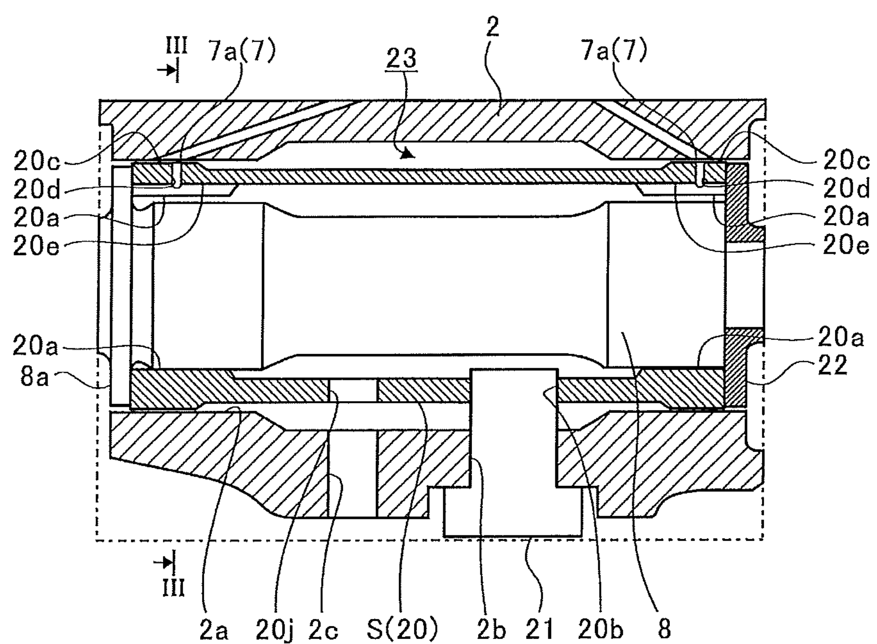
FIG. 2 is an extracted diagram of a one-dot chain line portion of FIG. 1.

FIG. 2 is an extracted diagram of a one-dot chain line portion of FIG. 1. As illustrated in FIG. 2, the semi-floating bearing S has an annular main body portion 20. The main body portion 20 is accommodated in the bearing hole 2*a*. On an inner circumferential of the main body portion 20, a bearing surface 20*a* is formed on each of the turbine housing 4 side and the compressor housing 6 side. The bearing surface 20*a* on the turbine housing 4 side and the bearing surface 20*a* on the compressor housing 6 side are separated in the axial direction of the shaft 8.

Moreover, in the main body portion 20, a pin hole 20*b* is formed between the two bearing surfaces 20*a*. The pin hole 20*b* penetrates the main body portion 20 in a direction intersecting the axial direction of the shaft 8, which is the radial direction of the shaft 8 here. Meanwhile, a through hole 2*b* is formed in the bearing housing 2. In the through hole 2*b*, a regulating pin 21 is press-fitted and fixed. The through hole 2*b* is provided at a position opposed to the pin hole 20*b*. A tip of the regulating pin 21 fixed to the through hole 2*b* enters the pin hole 20*b*. As a result, movement of the semi-floating bearing S in the rotation direction of the shaft 8 is restricted.

A gap 23 is formed between an outer circumferential surface of the main body portion 20 and an inner circumferential surface of the bearing hole 2*a*. On the outer circumferential surface of the main body portion 20, a damper surface 20*c* is formed at each of both axial ends of the shaft 8. The damper surface 20*c* is a portion where the gap 23 formed between the main body portion 20 and the bearing hole 2*a* is the smallest. By allowing lubricating oil supplied between the damper surface 20*c* and the inner circumferential surface of the bearing hole 2*a* to function as a damper, vibration of the shaft 8 is suppressed.

Furthermore, the shaft 8 is provided with a flange portion 8*a* at a portion positioned in the bearing hole 2*a*. The flange portion 8*a* has an outer diameter larger than that of a portion inserted into the main body portion 20 of the semi-floating bearing S. The flange portion 8*a* is opposed to one of end surfaces of the main body portion 20 in the axial direction of the shaft 8 (here, left side in FIG. 2).

Meanwhile, an oil thrower member 22 is arranged opposed to the other end surface of the main body portion 20 in the axial direction of the shaft 8 (here, right side in FIG. 2). The oil thrower member 22 is fixed to the shaft 8. The oil thrower member 22 scatters lubricating oil flowing from the semi-floating bearing S toward the compressor impeller 10 outward in the radial direction of the shaft 8. As a result, leakage of lubricating oil to the compressor impeller 10 side is suppressed.

As described above, the semi-floating bearing S is positioned between the flange portion 8*a* of the shaft 8 and the oil thrower member 22. Each of the both end surfaces in the axial direction of the main body portion 20 is opposed to one of the flange portion 8*a* and the oil thrower member 22. Therefore, the semi-floating bearing S receives a radial load of the shaft 8 on the two bearing surfaces 20*a*. Furthermore, the semi-floating bearing S receives a thrust load from the flange portion 8*a* and the oil thrower member 22.

In the bearing housing 2, the oil supply passage 7 for guiding lubricating oil from the outside to the bearing hole 2*a* is formed. The oil supply passage 7 bifurcates into two passages in the bearing housing 2. Each of the oil supply passages 7 opens to one of the damper surface 20*c* on the turbine housing 4 side and on the damper surface 20*c* on the compressor housing 6 side. Two openings 7*a* of the oil supply passages 7 are positioned outward in the radial direction with respect to the bearing surface 20*a*.

Furthermore, in the main body portion 20, oil guiding holes 20*d* are formed at positions opposed to the two openings 7*a*. The oil guiding hole 20*d* penetrates from the damper surface 20*c* to the bearing surface 20*a*. Three oil guiding holes 20*d* are provided at equal distances apart from each other in the circumferential direction of the main body portion 20 on each of the turbine housing 4 side and the compressor housing 6 side (see FIGS. 3A and 3B).

Therefore, in each of the turbine housing 4 side and the compressor housing 6 side, a part of lubricating oil guided from the opening 7*a* to the bearing hole 2*a* is guided to the bearing surface 20*a* via the oil guiding hole 20*d*. This allows sufficient lubricating oil to be secured in both of the bearing surfaces 20*a*.

An oil supply groove 20*e* is formed in a portion of the bearing surface 20*a* where the oil guiding hole 20*d* opens. Here, the oil supply groove 20*e* extends from one end to the other end of the bearing surface 20*a* in the axial direction of the shaft 8. Lubricating oil is guided from the oil guiding hole 20*d* to the oil supply groove 20*e*. The lubricating oil guided to the oil supply groove 20*e* expands in the axial direction of the shaft 8 along the oil supply groove 20*e*.

Figure 3A:
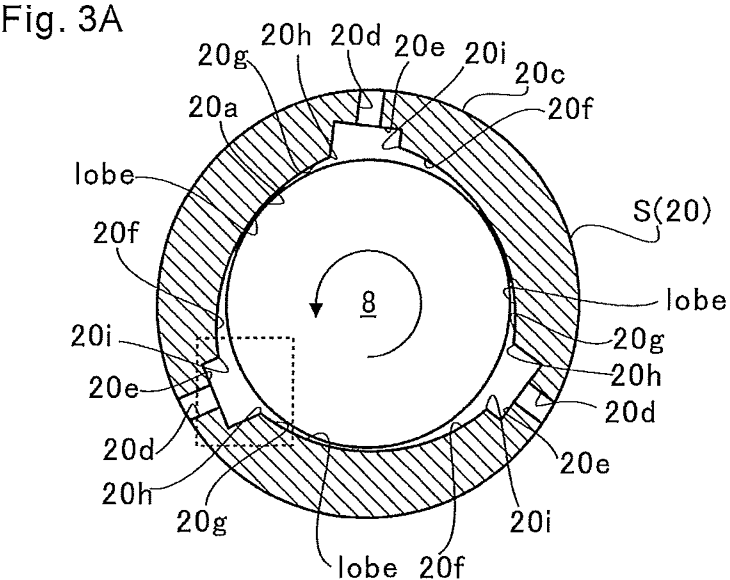
FIG. 3A is a diagram illustrating a cross-sectional view taken along a line in FIG. 2.
Figure 3B:
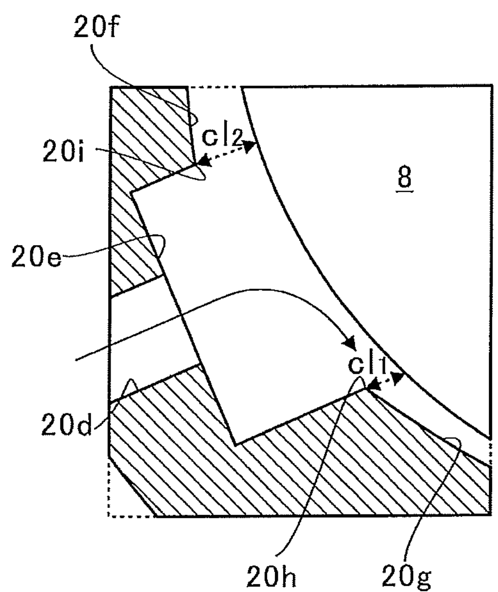
FIG. 3B is a diagram extracting and illustrating a broken line portion of FIG. 3A.

FIG. 3A is a diagram illustrating a cross-sectional view taken along a line in FIG. 2, and FIG. 3B is a diagram extracting and illustrating a broken line portion of FIG. 3A. The bearing surface 20*a* on the turbine housing 4 side and the bearing surface 20*a* on the compressor housing 6 side have substantially equivalent shapes. Therefore, in order to avoid repetition, the bearing surface 20*a* on the turbine housing 4 side will be described, and descriptions on the bearing surface 20*a* on the compressor housing 6 side will be omitted.

As illustrated in FIG. 3A, the bearing surface 20*a* includes a plurality (here, three) of arcs lobe in a cross-sectional shape perpendicular to the axial direction of the shaft 8 (hereinafter simply referred to as a cross-sectional shape). Specifically, the oil supply grooves 20*e* are formed on the bearing surface 20*a*. The oil supply groove 20*e* is formed between two arcs lobe adjacent to each other in the rotation direction of the shaft 8. In other words, the oil supply groove 20*e* is formed to straddle two arcs lobe adjacent to each other in the rotation direction of the shaft 8.

In addition, the cross-sectional shape of the bearing surface 20*a* includes a plurality of arcs lobe, whereas a cross-sectional shape of the shaft 8 is a circle. Therefore, when the shaft 8 is at a position coaxial with the main body portion 20, a bearing clearance (separation distance between the shaft 8 and the bearing surface 20*a*) becomes non-uniform in the circumferential direction of the shaft 8.

Specifically, the bearing surface 20*a* has an expanding portion 20*f* and a shrinking portion 20*g*. The expanding portion 20*f* is a portion where the bearing clearance expands continuously (gradually increased) in the rotation direction of the shaft 8 (the direction indicated by an arrow in FIG. 3A). The shrinking portion 20*g* is a portion where the bearing clearance shrinks continuously (gradually reduced) in the rotation direction. As illustrated in FIG. 3A, the expanding portion 20*f* and the shrinking portion 20*g* are alternately arranged in the rotation direction. In the oil supply groove 20*e*, a front side end portion 20*h* in a front side in the rotation direction of the shaft 8 is continuous with the shrinking portion 20*g*. In the oil supply groove 20*e*, a rear side end portion 20*i* in a rear side in the rotation direction of the shaft 8 is continuous with the expanding portion 20*f*.

Furthermore, as illustrated in FIG. 3B, in the oil supply groove 20*e*, a bearing clearance $cl_1$ (gap with the shaft 8) at the front side end portion 20*h* in the front side in the rotation direction of the shaft 8 is smaller than a bearing clearance $cl_2$ (gap with the shaft 8) at the rear side end portion 20*i* in the rear side in the rotation direction.

The lubricating oil guided to the oil supply groove 20*e* is dragged and rotated as indicated by a solid arrow in FIG. 3B as the shaft 8 rotates. Then, the lubricating oil flows into the gap (bearing clearance) between the front side end portion 20*h* and the shaft 8. A part of the lubricating oil having lubricated the bearing surface 20*a* is discharged from an axial end portion of the bearing surface 20*a* (the main body portion 20). As illustrated in FIG. 2, an oil discharge hole 20*j* is further formed between the two bearing surfaces 20*a* of the main body portion 20. The oil discharge hole 20*j* penetrates the main body portion 20 in a direction intersecting the axial direction of the shaft 8, which is the radial direction of the shaft 8 here. Meanwhile, the bearing housing 2 is provided with an opposing hole 2*c* at a position opposed to the oil discharge hole 20*j*. A part of the lubricating oil having lubricated the bearing surface 20*a* passes through the oil discharge hole 20*j* and the opposing hole 2*c* and is discharged from the bearing hole 2*a*.

At this time, the viscosity of the lubricating oil lubricating between the shaft 8 and the bearing surface 20*a* depends on the temperature of the oil. If the amount of oil flowing into (flowing out from) the gap between the shaft 8 and the bearing surface 20*a* becomes too large, the temperature of the lubricating oil cannot be sufficiently raised due to the temperature of surrounding members such as the shaft 8. In the case, the viscosity of the lubricating oil does not decrease and a mechanical loss increases. Here, the bearing clearance $cl_1$ of the front side end portion 20*h* is formed to be smaller than the bearing clearance $cl_2$ of the rear side end portion 20*i*. Therefore, the amount of lubricating oil flowing into the gap between the shaft 8 and the bearing surface 20*a* is suppressed as compared with a case where the bearing clearance $cl_1$ of the front side end portion 20*h* is larger than the bearing clearance $cl_2$ of the rear side end portion 20*i*. As a result, it is possible to sufficiently raise the temperature of the lubricating oil and to reduce the mechanical loss.

It is also possible to reduce the mechanical loss by adjusting the amount of oil by hydraulic pressure control or other control. However, in this case, control in accordance with the number of revolutions of the shaft 8 is needed. Also, depending on control processing, lubricating oil may be insufficient. On the other hand, in the case where the bearing clearance $cl_1$ of the front side end portion 20*h* is formed to be smaller than the bearing clearance $cl_2$ of the rear side end portion 20*i*, it is possible to easily and reliably supply the minimum needed amount of oil without complicated control processing.

In the aforementioned embodiment, the case where the oil supply groove 20*e* extends from one end to the other end of the bearing surface 20*a* in the axial direction of the shaft 8 has been described. Note that the oil supply groove 20*e* may not extend from one end to the other end of the bearing surface 20*a* as long as the oil supply groove 20*e* extends in the axial direction of the shaft 8. However, if the oil supply groove 20*e* extends from one end to the other end of the bearing surface 20*a*, an effect of suppressing the amount of flowing lubricating oil can be expected over the entire length in the axial direction. Therefore, an effect of reducing the mechanical loss is high.

Furthermore, in the aforementioned embodiment, the oil supply groove 20*e* is arranged between the arcs lobe adjacent to each other in the rotation direction of the shaft 8. Descriptions have been further provided on the case where, on the bearing surface 20*a*, the expanding portion 20*f* and the shrinking portion 20*g* are alternately arranged in the rotation direction. Note that the oil supply groove 20*e* may not be arranged between the adjacent arcs lobe. Moreover, in the bearing surface 20*a*, the expanding portion 20*f* and the shrinking portion 20*g* may not be alternately arranged in the rotation direction. In this case, a boundary portion may disadvantageously remain where adjacent arcs lobe are continuous and a step may be formed at the boundary portion. This step disturbs the flow of the lubricating oil. On the other hand, in the case where the oil supply groove 20*e* is arranged between the adjacent arcs lobe, and the expanding portion 20*f* and the shrinking portion 20*g* are alternately arranged in the rotation direction on the bearing surface 20*a*, the following effect can be achieved. That is, in processing of forming the oil supply groove 20*e*, the boundary portion between the adjacent arcs lobe is removed. Therefore, it is possible to avoid a situation in which a step remains at the boundary portion to disturb the flow of the lubricating oil.

Furthermore, in the aforementioned embodiment, the case has been described where the front side end portion 20*h* is continuous with the shrinking portion 20*g* and the rear side end portion 20*i* is continuous with the expanding portion 20*f*. Note that the oil supply groove 20*e* may not be arranged between adjacent arcs lobe. The front side end portion 20*h* may not be continuous with the shrinking portion 20*g*. The rear side end portion 20*i* may not be continuous with the expanding portion 20*f*. For example, the oil supply groove 20*e* may be formed not between adjacent arcs lobe but at the shrinking portion 20*g* at each arc lobe. However, in the case where the front side end portion 20*h* is continuous with the shrinking portion 20*g* and the rear side end portion 20*i* is continuous with the expanding portion 20*f*, the following effect is achieved. That is, it is possible to secure a large area for the shrinking portion 20*g* where the oil film pressure is generated, thereby improving the bearing performance.

Furthermore, in the aforementioned embodiment, the case where the multi-arc bearing is the semi-floating bearing S has been described. For example, the multi-arc bearing may be a full-floating metal that is rotated with the rotation of the shaft 8 without being restricted from moving in the rotational direction. Here, in general, semi-floating bearings result in a greater mechanical loss than full-floating metals. Therefore, by employing the semi-floating bearing S as the multi-arc bearing, the effect of reducing the mechanical loss becomes even greater.

Furthermore, in the aforementioned embodiment, the case has been described where a total of three oil supply grooves 20*e* are provided, with each one of the three oil supply grooves 20*e* arranged between two of the three arcs lobe. Note that the oil supply groove 20*e* may be provided, for example, at only one or two of three portions between the three arcs lobe. In this case, inflow of the lubricating oil to the bearing surface 20*a* is further suppressed. Therefore, it is possible to further reduce the mechanical loss.

Furthermore, in the aforementioned embodiment, the semi-floating bearing S in which the bearing surface 20*a* including the three arcs lobe in the cross-sectional shape is formed has been described as an example. Note that the number of arcs lobe may be two or four or more.

Although the reasonable embodiment has been described with reference to the accompanying drawings, it is naturally understood that the respective configurations are not limited to the above embodiment. It is clear that those skilled in the art can conceive various modifications or variations within the scope described in the claims, and it is understood that they are naturally also within the technical scope.

INDUSTRIAL APPLICABILITY

The present disclosure can be applied to a multi-arc bearing pivotally supporting a shaft and a turbocharger.

What is claimed is:

1. A multi-arc bearing, comprising:

a bearing surface a cross-sectional shape of which perpendicular to an axial direction of a shaft includes a plurality of arcs; and an oil supply groove provided on the bearing surface between two arcs adjacent to each other in a rotation direction of the shaft and extending in the axial direction of the shaft, the oil supply groove having a bearing clearance at a front side end portion in the rotation direction of the shaft smaller than a bearing clearance at a rear side end portion in the rotation direction of the shaft.

2. The multi-arc bearing according to claim 1, wherein the bearing surface includes:

an expanding portion in which a bearing clearance thereof expands continuously in the rotation direction of the shaft; and a shrinking portion in which a bearing clearance thereof shrinks continuously in the rotation direction of the shaft, the expanding portion and the shrinking portion arranged alternately in the rotation direction of the shaft.

3. The multi-arc bearing according to claim 2, wherein the multi-arc bearing is a semi-floating bearing having an annular main body portion in which the bearing surface is formed on an inner circumferential surface thereof.

4. The multi-arc bearing according to claim 3, wherein the two arcs have curvature centers different having different positions from each other.

5. The multi-arc bearing according to claim 2, wherein the two arcs have curvature centers different having different positions from each other.

6. The multi-arc bearing according to claim 2, wherein the front side end portion is continuous with the shrinking portion, and wherein the rear side end portion is continuous with the expanding portion.

7. The multi-arc bearing according to claim 6, wherein the multi-arc bearing is a semi-floating bearing having an annular main body portion in which the bearing surface is formed on an inner circumferential surface thereof.

8. The multi-arc bearing according to claim 7, wherein the two arcs have curvature centers different having different positions from each other.

9. The multi-arc bearing according to claim 6, wherein the two arcs have curvature centers different having different positions from each other.

10. The multi-arc bearing according to claim 1, wherein the multi-arc bearing is a semi-floating bearing having an annular main body portion in which the bearing surface is formed on an inner circumferential surface thereof.

11. The multi-arc bearing according to claim 10, wherein the two arcs have curvature centers different having different positions from each other.

12. A turbocharger comprising the multi-arc bearing according to claim 1.

13. The multi-arc bearing according to claim 1, wherein the two arcs have curvature centers different having different positions from each other.

* * * * *